United States Patent [19]

Tsuzuki

[11] Patent Number: 4,515,452

[45] Date of Patent: May 7, 1985

[54] DATA INSERTING DEVICE FOR CAMERA

[75] Inventor: Hiroyoshi Tsuzuki, Kanagawa, Japan

[73] Assignee: Canon Kabushuki Kaisha, Tokyo, Japan

[21] Appl. No.: 579,662

[22] Filed: Feb. 13, 1984

[51] Int. Cl.³ .................. G03B 17/24; H05B 37/03
[52] U.S. Cl. .................. 354/106; 315/135; 340/652
[58] Field of Search .................. 354/105–109, 354/127.1, 127.11, 127.12, 289.1, 289.11, 289.12, 471; 352/55; 355/39, 40; 378/162–166; 116/213; 340/635, 641, 642, 652; 315/129–133, 135, 136; 324/414

[56] References Cited

U.S. PATENT DOCUMENTS 2,625,863  1/1953  Kirwin .................. 354/127.11
2,942,537  6/1960  Zimmerman .................. 354/109

FOREIGN PATENT DOCUMENTS 0137339  10/1981  Japan .................. 354/106

Primary Examiner—William B. Perkey
Attorney, Agent, or Firm—Toren, McGeady, Stanger, Goldberg & Kiel

[57] ABSTRACT

A data inserting device for a camera arranged to automatically insert data in response to an insertion trigger signal from the camera body includes abnormity detecting means which supplies current to a specific part where such abnormity that hinders the data inserting action tends to occur and is arranged to detect the abnormity by an impedance change occurred at the part, and external display means for displaying the abnormity upon detection thereof by the detecting means.

11 Claims, 5 Drawing Figures

DATA INSERTING DEVICE FOR CAMERA

BACKGROUND OF THE INVENTION

1. Field of the Invention

This invention relates to a data inserting device for a camera and more particularly to a data inserting device of the type automatically inserting data upon receipt of an insertion trigger signal from a camera body.

2. Description of the Prior Art

The data inserting devices for cameras of the type having an electronic clock or the like provided within a camera for automatically inserting such data as the year, month and date have recently increased in number. Most of them are arranged at the back cover of the camera to insert the data displayed by a liquid crystal display device from the reverse side of film with light emitted from a light source. However, with a camera arranged in that manner, the data inserting device would not operate and fail to record the data if the camera body is not adequately connected to the data inserting device due to some reasons. For example, in case that the data inserting device is arranged to be connected by means of contact pins or the like, inadequate closure of the back cover renders the device inoperative. Despite such probability, however, there has been provided no means for informing the photographer of such an abnormity.

Further, an incandescent lamp is generally employed as light source for data insertion. However, such a light source tends to break while in use. In such events, data are also not recorded without giving any warning to the photographers.

SUMMARY OF THE INVENTION

It is therefore an object of the present invention to provide a data inserting device for a camera which is capable of solving the above-stated problem of the prior art devices and is arranged to inform the photographer of any abnormity of a specific precarious part that tends to render a data inserting device inoperative.

To attain this object, the data inserting device according to the invention is provided with abnormity detecting means which supplies current to the specific part where such abnormity that hinders a data inserting action is apt to occur and is arranged to detect the abnormity by a change in impedance of the specific part; and external display means for displaying the abnormity upon detection thereof by the abnormity detecting means.

The above and further objects and features of the invention will become apparent from the following detailed description of a preferred embodiment thereof taken in connection with the accompanying drawings.

DETAILED DESCRIPTION OF THE PREFERRED EMBODIMENT

Figure 1:
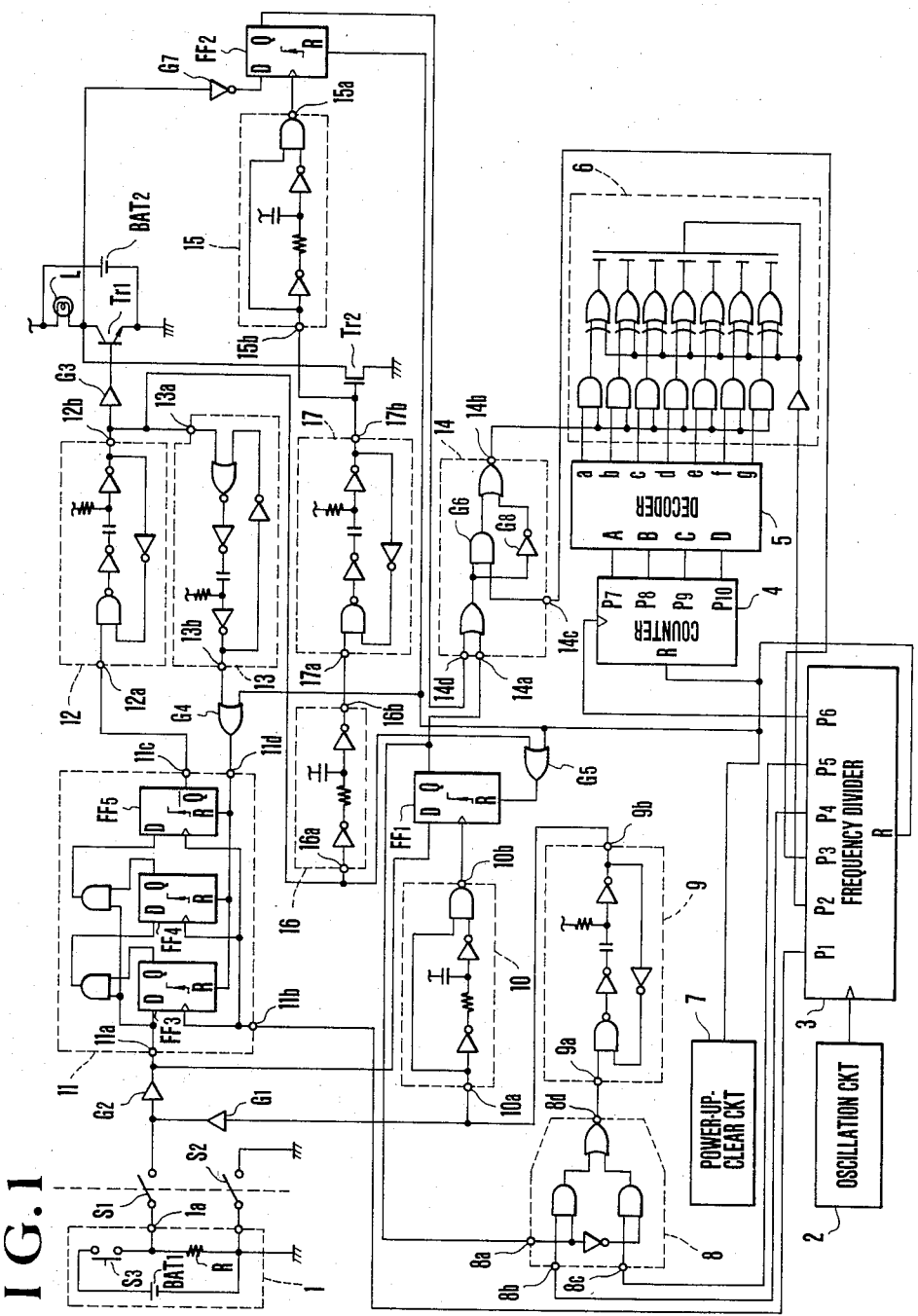
FIG. 1 is a circuit diagram showing an embodiment of the invention.

Referring to FIG. 1, a data insertion trigger circuit 1 is disposed on the side of a camera body and is in connection with other parts via switches S1 and S2. In case that all parts other than the data insertion trigger circuit 1 are disposed on the back cover of the camera, the switches S1 and S2 consist of contact pins in general. These switches are arranged to be on when the back cover is closed and to be off when the back cover is open. An oscillation circuit 2 is arranged to supply the output thereof to a frequency divider 3. The frequency divider 3 is arranged to produce frequency divided outputs P1–P6 of six different frequency values. The frequency divided output P6 is supplied to a counter 4. The counter 4 is arranged to produce the outputs P7–P10 thereof to the input terminals A, B, C and D of a decoder 5. According to these inputs, the decoder 5 produces seven segment outputs a, b, c, d, e, f and g to a liquid crystal display circuit 6 for external display and also to a similar liquid crystal display circuit for data insertion (not shown). Upon receipt of these outputs of the decoder 5, the liquid crystal display circuit 6 makes a liquid crystal display of data for the photographer.

Figure 2:
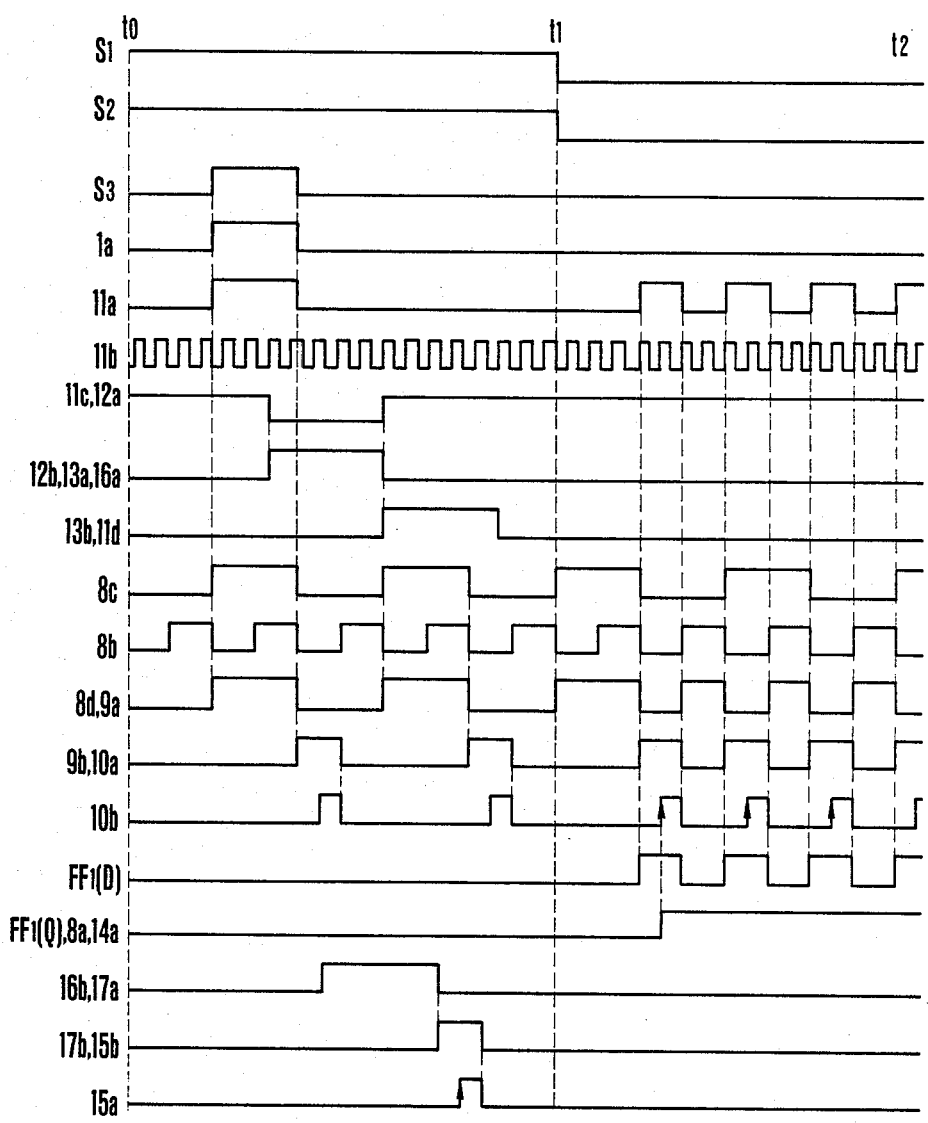
FIGS. 2-5 are time charts showing the operation of the same embodiment.
Figure 3:
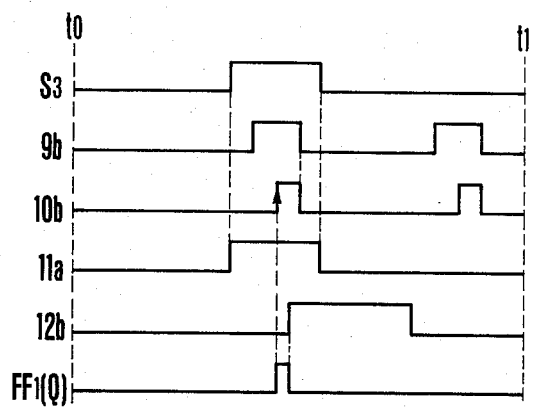

Under a normal condition without any abnormity, the embodiment operates as follows: Referring to FIGS. 2 and 3, the operation corresponds to the period of time from time t0 to time t1 shown in FIGS. 2 and 3. First, when a power source battery BAT1 is set a power-up-clear circuit 7 operates to reset D type flip-flops FF1–FF5, the frequency divider 3 and the counter 4. As a result, the output level of the D type flip-flop FF1 becomes low. The low level output is supplied to the input terminal 8a of a frequency selection circuit 8. Meanwhile, the frequency divided outputs P4 and P5 of the frequency divider 3 are supplied respectively to other input terminals 8b and 8c of the frequency selection circuit 8. The circuit 8 selects the frequency divided output P5 which is of low frequency when the input to the input terminal 8a is at a low level. In that instance, the output terminal 8d of the frequency selection circuit 8 produces the frequency divided output P5 to the input terminal 9a of a one-shot multivibrator circuit 9. The one-shot multivibrator circuit 9 is arranged to produce a one-shot pulse output from the output terminal 9b thereof when the level of the input signal thereof changes from a high level to a low level. This one-shot pulse is allowed to flow via a buffer gate G1 to a resistor R by the switches S1 and S2 when they are on. The resistance value of the resistor R is set at such a value that a voltage drop is effected for the output current of the buffer gate G1 in such a way as to logically lower the level of the output of a buffer gate G2 resulting from the one-shot pulse. With the resistance value of the resistor R set in this manner, the level of the input to the input terminal D of the D type flip-flop FF1 becomes low. The output from the output terminal 9b of the one-shot multivibrator 9 is supplied to the input terminal 10a of a delay circuit 10. Then, the output terminal 10b of the delay circuit 10 produces to the clock input terminal of the D type flip-flop FF1 a pulse output obtained in such a form that the rise of the one-shot pulse from the one-shot multivibrator circuit 9 is delayed. The output terminal Q of the flip-flop FF1 then produces the input received at that time by the input terminal D of the flip-flop FF1.

When a switch S3 is turned on under the above-stated condition, voltage supply from the power source battery BAT1 causes the output level of the output terminal 1a of the data insertion trigger circuit 1 to be high while the switch S3 is on. This high level signal, i.e. a data insertion trigger signal, thus obtained comes to the input terminal 11a of a trigger signal discrimination circuit 11. To prevent an erroneous action due to a noise or the like, the trigger signal discrimination circuit 11 samples the high level signal at least twice. The circuit 11 includes D type flip-flops FF3–FF5. All the flip-flops FF3–FF5 have the frequency divided output P1 of the frequency divider 3 supplied thereto via the input terminal 11b of the circuit 11. The output terminal Q of each of the flip-flops FF3–FF5 produces a high level signal if the signal supplied to the input terminal D thereof is at a high level at the edge of the rise of the above-stated frequency divided output P1 from a low level to a high level. With this circuit used, therefore, even when the high level signal is supplied to the input terminal 11a thereof, if the above-stated high level signal does not remain at the high level for a period of time required for the frequency divided output P1 supplied to the input terminal 11b in rising at least twice from a low level to a high level, the output of the inversion output terminal $\overline{Q}$ of the D type flip-flop FF5 does not change to a low level from a high level. The insertion trigger signal is discriminated and an erroneous action is prevented in this manner.

When the insertion trigger signal is determined to be authentic, the level of the output from the output terminal 11c of the trigger signal discrimination circuit 11 becomes low. The low level signal thus produced is supplied to the input terminal 12a of a one-shot multivibrator circuit 12. The circuit 12 produces from the output terminal 12b thereof a one-shot pulse output which lasts for a given length of time from the instant the input to the input terminal 12a becomes a low level. This one-shot pulse renders a transistor Tr1 conductive via a buffer gate G3. Therefore, a power source battery BAT2 causes a light source lamp L to emit light for a given period of time. With the light emitted, data displayed by a liquid crystal display circuit (not shown) for data insertion are recorded on a film. At the same time, the liquid crystal display device 6 displays the data on the outside of the camera. Further, the output produced from the output terminal 12b of the one-shot multivibrator circuit 12 is supplied also to the input terminal 13a of a one-shot multivibrator circuit 13. Therefore, the instant the output level of the output from the output terminal 12b of the other one-shot multivibrator circuit 12 becomes low, the multivibrator circuit 13 produces the one-shot pulse. This one-shot pulse is supplied via an OR gate G4 and an input terminal 11d to the reset terminals R of the D type flip-flops FF3–FF5 of the trigger signal discrimination circuit 11. This input brings the output level of the output terminal 11c of the trigger signal discrimination circuit 11 back to a high level when the light emission of the light source lamp L comes to an end.

The foregoing description of operation applies to a case where the switched-on state of the switch S3 does not obtain concurrently with the time when the level of the output from the output terminal 9b of the one-shot multivibrator circuit 9 becomes a high level. In the event that the above-stated two concurrently take place, the level of the output of the D type flip-flop FF1 becomes high while the switch S3 is on, i.e. while the input terminal D of the D type flip-flop FF1 is having the high level signal, because the high level signal is supplied from the output terminal 10b of the delay circuit 10 to the D type flip-flop FF1. When the output level of the D type flip-flop FF1 becomes high, the liquid crystal display changes to a flickering display state which informs the photographer of an abnormity as will be further described later herein. In this event, since the output from the output terminal 12b of the one-shot multivibrator circuit 12 is supplied via the OR gate G5 to the reset terminal R of the D type flip-flop FF1, the high level output of the D type flip-flop FF1 lasts only for a negligibly short period of time. The output level of the flip-flop FF1 is thus promptly changed to a low level by a high level input to the reset terminal R of the flop-flop FF1.

Figure 4:
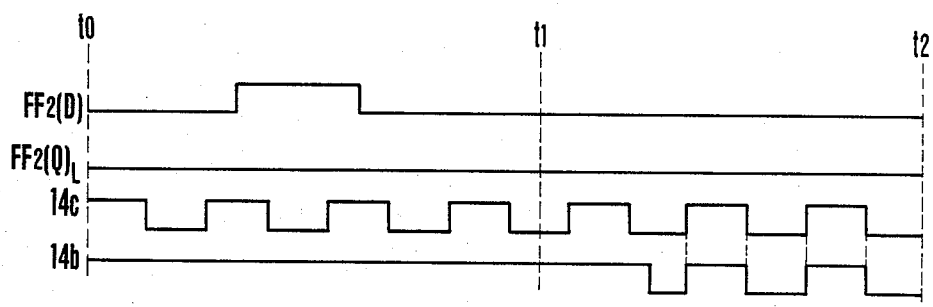

Next, assuming that the first cause for the abnormity that hinders a data inserting action is inadvertent and inadequate closing of the back cover of the camera (not shown) or some inadequate contact bringing at least either one of the switches S1 and S2 into a switched-off state, the embodiment operates as follows: This operation corresponds to the period between the point of time t1 and that of time t2 shown in FIGS. 2 and 4. With either the switch S1 or the switch S2 not switched on, a closed loop which is otherwise formed by the buffer gate G1, the switch S1, the resistor R and the switch S2 when both the switches S1 and S2 are on is not formed. Therefore, the level of the input which is supplied to the input terminal D of the D type flip-flop FF1 while the one-shot pulse is being produced from the output terminal 9b of the one-shot multivibrator circuit 9 becomes high. Accordingly, at the point of time when the high level signal obtained by delaying the one-shot pulse coming from the one-shot multivibrator circuit 9 by the delay circuit 10 is supplied to the D type flip-flop FF1 from the output terminal 10b of the delay circuit 10, the level of the output of the D type flip-flop FF1 changes to a high level.

When this high level signal comes to the input terminal 8a of the frequency selection circuit 8, the circuit 8 which has been selecting the low frequency of the frequency divided output P5 comes to select the high frequency of the frequency divided output P4 and produces it from its output terminal 8d to the input terminal 9a of the one-shot multivibrator circuit 9. This circuit 8 determines the abnormity or non-abnormity of the switches S1 and S2 by the output level of the D type flip-flop FF1. The output level of the circuit 8 is thus determined by the input level of the input terminal D every time the high level signal comes from the output terminal 10b of the delay circuit 10 to the D type flip-flop FF1. Therefore, the selection of the higher frequency by the circuit 8 when the occurrence of abnormity results in the high output level of the D type flip-flop FF1 permits immediate detection of return to a normal condition and prompt display thereof when the abnormity is removed. Further, the arrangement to select a lower frequency under a normal condition without any abnormity lowers power consumption.

With the output level of the D type flip-flop FF1 changed to a high level, the high level output (or signal) from the flip-flop FF1 comes to the input terminal 14a of a liquid crystal display selection circuit 14. This causes an AND gate G6 to open. Then, the output terminal 14b of the circuit 14 which has been producing a high level output comes to produce, via the AND gate G6, the frequency divided output P3 of the frequency divider 3 which has been supplied via the input terminal 14c of the circuit 14. This frequency divided output P3 thus comes to the liquid crystal display circuit 6 to cause it to make a flickering display. The flickering display then informs the photographer of the occurrence of the abnormity.

Figure 5:
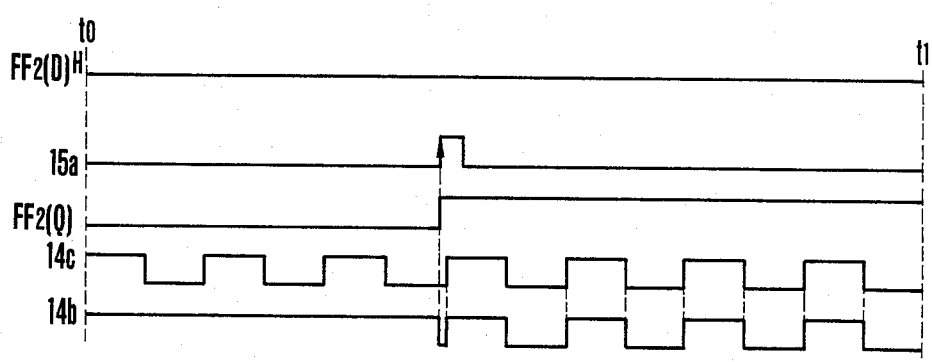

Let us now assume that a second cause for the abnormity rendering a data inserting action impossible is breakage of the light source lamp L. The operation of the embodiment in that instance is as follows: This operation corresponds to the operation between the point of time t0 and the point of time t1 shown in FIGS. 2 and 5. When the light source lamp L is not broken and is not emitting light, the sink current of a field-effect type transistor Tr2 is arranged as follows: The light source lamp L causes a voltage drop in such a way as to result in a high level of the drain potential, i.e. a high level of an input to an inverter G7. Therefore, if the light source lamp L is not broken, the high level signal is supplied to the input terminal D of the D type flip-flop FF2 only while the light source lamp L is emitting light. Then, since the one-shot pulse produced from the one-shot multivibrator circuit 12 for causing the light source lamp L to light up is coming via the delay circuit 16, the one-shot multivibrator circuit 17 and the delay circuit 15, a high level signal produced from the output terminal 15a of the delay circuit 15 to the D type flip-flop FF2 does not overlap the high level input to the input terminal D of the D type flip-flop FF2. Therefore, the output from the output terminal Q of the D type flip-flop FF2 is kept at a low level. This low level output is supplied to the input terminal 14d of the liquid display selection circuit 14. The output from the output terminal 14b of this circuit 14 is inverted by an inverter G8 and remains at a high level. As a result, the liquid crystal display does not flicker and thus shows no abnormality. Whereas, in the event of breakage of the light source lamp L, the drain potential of the field effect transistor Tr2 becomes a low level. Then, the input to the input terminal D of the D type flip-flop FF2 continues to be at a high level. Therefore, at the point of time when the output level of the output terminal 15a of the delay circuit 15 rises to a high level, the output of the D type flip-flop FF2 changes from a low level to a high level. The high level signal thus obtained is supplied to the input terminal 14d of the liquid display selection circuit 14. The output of the output terminal 14b of the liquid display selection circuit 14 is then the frequency divided output P3 of the frequency divider 3 in the same manner as in the case of the inadequate connection of the switch S1 or S2. Therefore, the liquid display also flickers to inform the photographer of the occurrence of the abnormity.

In FIG. 1, the liquid display device 6 is shown as a display device of one digit. However, display device of two digits or more can be also arranged in exactly the same manner. Further, in this embodiment, the display state of the liquid display device 6 for the external display of inserting data is arranged to change in informing the photographer of the presence of an abnormity. However, it is also possible to provide some external display means for the sole purpose of informing the photographer of the presence of an abnormity separately from the external display means for displaying the inserting data.

In the embodiment shown in FIG. 1, the switches S1 and S2 and the light source lamp L represent the specific part that tends to bring about the abnormity mentioned in the description of the object of the invention. The D type flip-flops FF1 and FF2, the frequency divider 3, the resistor R, the field effect transistor Tr2, the delay circuits 10, 15 and 16 and the one-shot multivibrator circuits 9 and 17 represent the abnormity detecting means of the invention. The liquid crystal display selection circuit 14 and the liquid crystal display circuit 6 represent the external display means of the invention.

In accordance with the invention, as has been described in the foregoing, current is supplied to a specific part where some abnormity that renders a data inserting action impossible is apt to occur; the abnormity detecting means is arranged to detect the abnormity by an impedance change occurred at the specific part; and the external display means is arranged to display the abnormity in response to detection of the abnormity by the abnormity detecting means. Therefore, the photographer can be duly informed of the occurrence of any abnormity of the specific part which is apt to render a data inserting action impossible.

What I claim:
1. A data inserting device for a camera, comprising:
  data inserting circuit means;
  transmitting means for transmitting a data insertion trigger signal from a camera body to said data inserting circuit means;
  display means for displaying data on the outside of the camera; and
  abnormity detecting means which supplies a current to said transmitting means and detects an abnormity by a change of impedance occurred at said transmitting means, said abnormity detecting means being arranged to indicate that data insertion is impossible by varying the display state of said display means when an abnormity is detected.
2. A data recording device for a camera, comprising:
  a circuit including a light source for illuminating data to be recorded and a first drive circuit therefor;
  a second drive circuit separate from said first drive circuit for use in detecting abnormal situations;
  a detecting circuit for detecting the occurrence of an abnormal situation in the form of a change of the impedance as the current is allowed to flow for a predetermined period of time from said second circuit; and
  display means for displaying data externally so that when said detecting means detects the abnormal condition the display state of said display means changes to represent that data cannot be recorded at that time.
3. A device according to claim 1 or 2, wherein said abnormity detecting means is arranged to cause said display means to flicker when an abnormity is detected.
4. A device as in claim 3, wherein said display means is a liquid crystal display device.
5. A device as in claim 3, wherein said circuit is disposed on the back cover of the camera.
6. A device according to claims 1 or 2, wherein said display means is a liquid crystal display device.
7. A device as in claim 6, wherein said circuit is disposed on the back cover of the camera.
8. A data inserting device for a camera, comprising:
  a data inserting circuit including a light source for illumination;
  transmitting means for transmitting a data insertion trigger signal from a camera body to said data inserting circuit;
  abnormity detecting means which supplies a pulse current to said transmitting means and to said light source and detects an abnormity by a change of impedance; and
  display means for displaying impossibility of the data insertion when an abnormity of either said transmitting means or said light source is detected by said detecting means.

9. A data inserting device for a camera according to claim 8, wherein said display means is data display means.

10. A data recording device for a camera, comprising:
a data inserting circuit including a light source;
a current supply circuit for detecting an abnormal situation by allowing current to flow in a prescribed portion and make it possible to encounter the abnormal situation in which data cannot be recorded;
detecting means for detecting the occurrence of the abnormal situation in the form of a change of the impedance of that portion at which the abnormal situation has occurred as the current is allowed to flow to the portion for a prescribedd time from said current supply circuit; and
display means responsive to the detection of an occurrence of the abnormal situation by said detecting means for displaying imposssibility of recording data.

11. A device according to claim 1, 2, 8, 9, or 10, wherein said circuit is disposed on the back cover of the camera.

* * * * *

UNITED STATES PATENT AND TRADEMARK OFFICE
CERTIFICATE OF CORRECTION

PATENT NO. : 4,515,452
DATED : May 7, 1985
INVENTOR(S) : Hiroyoshi Tsuzuki, et al It is certified that error appears in the above-identified patent and that said Letters Patent is hereby corrected as shown below:

In the heading of the patent, it should read:

--[30]  Foreign Application Priority Data

Feb. 19, 1983 [JA]   Japan          58-25511 --

*Signed and Sealed this*

*Tenth* Day of *December 1985*

[SEAL]

*Attest:*

DONALD J. QUIGG

*Attesting Officer*   *Commissioner of Patents and Trademarks*